United States Patent
Gao et al.

(10) Patent No.: US 8,737,347 B2
(45) Date of Patent: May 27, 2014

(54) PILOT AND CHANNEL ESTIMATION METHOD FOR SDMA MIMO TRANSMISSION DOWNLINK

(75) Inventors: Xiqi Gao, Nanjing (CN); Bin Jiang, Nanjing (CN); Xiaohu You, Nanjing (CN); Teer Ba, Nanjing (CN); Shi Jin, Nanjing (CN); Jue Wang, Nanjing (CN); Dongming Wang, Nanjing (CN); Yanxiang Jiang, Nanjing (CN)

(73) Assignee: Southeast University (CN)

( * ) Notice: Subject to any disclaimer, the term of this patent is extended or adjusted under 35 U.S.C. 154(b) by 116 days.

(21) Appl. No.: 13/497,150

(22) PCT Filed: Nov. 2, 2010

(86) PCT No.: PCT/CN2010/078328
§ 371 (c)(1),
(2), (4) Date: Mar. 20, 2012

(87) PCT Pub. No.: WO2011/147159
PCT Pub. Date: Dec. 1, 2011

(65) Prior Publication Data
US 2012/0182964 A1    Jul. 19, 2012

(30) Foreign Application Priority Data
May 27, 2010 (CN) .......................... 2010 1 0184565

(51) Int. Cl.
*H04W 72/04* (2009.01)
(52) U.S. Cl.
USPC .......................................... 370/330; 370/478
(58) Field of Classification Search
USPC ............................... 370/330, 334, 478
See application file for complete search history.

(56) References Cited

U.S. PATENT DOCUMENTS

| 8,306,165 B2 * | 11/2012 | Huang et al. .................. 375/346 |
| 2003/0072254 A1 | 4/2003 | Ma et al. |

(Continued)

FOREIGN PATENT DOCUMENTS

| CN | 1605172 A | 4/2005 |
| CN | 101330486 A | 12/2008 |

(Continued)

OTHER PUBLICATIONS

International Search Report issued in PCT/CN2010/078328 dated Mar. 10, 2011.

*Primary Examiner* — Brian D Nguyen
(74) *Attorney, Agent, or Firm* — Rossi, Kimms & McDowell LLP

(57) ABSTRACT

A pilot and channel estimation method for SDMA MIMO transmission downlink is provided in the present invention, and the method provides possibility for saving the orthogonal pilot resources; the pilot signals of different users in the transmitting antenna domain can occupy the same time-frequency resources, and thereby the pilot overhead of system resources can be reduced greatly; the method includes: for the MIMO transmission downlink that employs pre-coding for SDMA, taking the quantity of orthogonal pilot resources occupied by the users in the pre-coding domain as the number of data streams that can be transmitted or the number of spatial dimensions occupied first, at the transmitting end of the base station; then, performing SDMA transmission pre-coding for the orthogonal pilots in the pre-coding domain in the same way as the data signals, to obtain the pilot signals of the users in the transmitting antenna domain; wherein, the pilots of the users in the pre-coding domain can be orthogonal in the frequency domain or code domain, and the pilots of different users in the pre-coding domain can be identical or not identical to each other; the pilot signals of different users in the transmitting antenna domain can occupy the same time-frequency resources.

3 Claims, 1 Drawing Sheet

(56) References Cited

U.S. PATENT DOCUMENTS

| | | | |
|---|---|---|---|
| 2008/0165891 A1* | 7/2008 | Budianu et al. | 375/299 |
| 2010/0124297 A1* | 5/2010 | Papasakellariou et al. | 375/260 |
| 2010/0197237 A1* | 8/2010 | Xu et al. | 455/67.11 |
| 2010/0272196 A1* | 10/2010 | Mansour et al. | 375/260 |
| 2010/0303136 A1* | 12/2010 | Ashikhmin et al. | 375/222 |

FOREIGN PATENT DOCUMENTS

| | | |
|---|---|---|
| CN | 101540751 A | 9/2009 |
| CN | 101867533 A | 10/2010 |

* cited by examiner

PILOT AND CHANNEL ESTIMATION METHOD FOR SDMA MIMO TRANSMISSION DOWNLINK

This application is a U. S. National Phase Application of PCT International Application PCT/CN2010/078328, filed on Nov. 02, 2010, which is based on and claims priority from CN 201010184565.1, filed on May 27, 2010. The contents of the documents cited in this paragraph are hereby incorporated herein by reference in their entireties.

FIELD OF THE INVENTION

The present invention relates to communication field, particularly to a pilot and channel estimation method for SDMA (Space Division Multiple Access) MIMO (Multiple Input Multiple Output) transmission downlink.

BACKGROUND OF THE INVENTION

The MIMO transmission technique is a basic approach for exploiting and utilizing spatial dimension radio resources and improving utilization ratio of spectrum and utilization ratio of power, and it has been a mainstream technique researched and developed in the mobile communication field for more than a decade. Owing to the limitations of MIMO configuration of mobile terminals, the angle spread of MIMO channels at the base station is usually very small; in addition, owing to factors such as the existence of visible path, the performance of MIMO transmission links for single user usually suffers big limitation, and therefore it is difficult to fully exploit and utilize radio resources of spatial dimension. For this reason, multi-user MIMO or SDMA MIMO transmission technique on the same time-frequency resources has received attention; the SDMA MIMO technique can improve the utilization ratio of radio resources to a greater degree.

In SDMA MIMO systems, due to the asymmetry between uplink and downlink, the channels are classified into uplink multiple access channel (MAC) and downlink broadcast channel (BC). The research work is carried out in the two aspects, and mainly focuses on the downlink. In order to implement SDMA MIMO downlink transmission, it is required to use a pre-coding technique to eliminate or suppress the interference between users. Available SDMA pre-coding techniques include short-time pre-coding that utilizes short-time channel state information and long-time pre-coding that utilizes long-time channel state information; short-time pre-coding is applicable to fixed and low-speed mobile communication environments, while long-time pre-coding is applicable to middle or high speed mobile communication environments.

In actual systems, in order to obtain the channel state information required for coherent detection and channel measurement accurately and timely, usually a pilot symbol assisted channel estimation method is used. In the SDMA MIMO downlink, the number of orthogonal pilots and the quantity of time-frequency resources occupied by the orthogonal pilots for the channel estimation will increase as the number of base station antennae increases. One of the urgent tasks is how to carry out pilot and channel estimation for SDMA MIMO downlink on limited time-frequency resources. The present invention provides a pilot and channel estimation method for SDMA MIMO transmission downlink.

SUMMARY OF THE INVENTION

Technical Problem

The purpose of the present invention is to provide a pilot and channel estimation method for SDMA MIMO transmission downlink, so as to provide the possibility for saving orthogonal pilot resources; the pilot signals of different users in the transmitting antenna domain can occupy the same time-frequency resources, so that the pilot overhead of system resources can be reduced greatly; the same pre-coding mode is used for orthogonal pilot and data signals of different users in the pre-coding domain, therefore the system is easy to implement.

Technical Solution

The pilot and channel estimation method for SDMA MIMO transmission downlink of the present invention includes: for the MIMO transmission downlink that employs pre-coding for SDMA, taking the quantity of orthogonal pilot resources occupied by the users in the pre-coding domain as the number of data streams that can be transmitted or the number of spatial dimensions occupied first, at the transmitting end of the base station; then, performing SDMA transmission pre-coding for the orthogonal pilots in the pre-coding domain in the same way as the data signals, to obtain the pilot signals of the users in the transmitting antenna domain; the pilots of the users in the pre-coding domain can be orthogonal in the frequency domain or code domain, and the pilots of different users in the pre-coding domain can be identical or not identical to each other; the pilot signals of different users in the transmitting antenna domain can occupy the same time-frequency resources; at the receiving end of users, obtaining the channel state information required for coherent detection and channel measurement for the users, with the transmitted pilot signals and received pilot signals known locally.

The pilot and channel estimation method for SDMA MIMO transmission downlink is characterized in: the pre-coding can be short-time pre-coding that utilizes short-time channel state information or long-time pre-coding that utilizes long-time channel state information; if short-time pre-coding is used to implement SDMA, both the pilot signals and data signals are transmitted in the short-time pre-coding domain; if long-time pre-coding is used to implement SDMA, the pilot signals are transmitted in the long-time pre-coding domain, while the data signals can be transmitted in the long-time pre-coding domain or in the pre-coding domain where long-time pre-coding and short-time pre-coding are compounded.

The pilot and channel estimation method for SDMA MIMO transmission downlink is characterized in: the channel state information required for coherent detection and channel measurement for the users refers to the channel state information in the pre-coding domain for implementing SDMA, and the matrix, vector or scalar used to describe the channel state information at a single frequency point is the product of the corresponding channel matrix or vector of the users and the pre-coding matrix or vector of the users; the compounded channel parameters in the pre-coding domain of the users can be estimated initially using the common least square channel estimation method with the locally known transmitted pilot signals and received pilot signals of the users, with possible pilot signals of other users regarded as random interference, and then can be estimated more accurately with techniques such as decorrelation, interpolation, and filtering.

Beneficial Effects

In the pilot and channel estimation method for SDMA MIMO transmission downlink provided in the present invention, the orthogonal pilots of different users in the pre-coding domain can be identical or not identical to each other, so as to provide the possibility for saving orthogonal pilot resources; the pilot signals of different users in the transmitting antenna domain can occupy the same time-frequency resources, so that the pilot overhead of system resources can be reduced greatly; the same pre-coding mode is used for the orthogonal pilot and data signals of different users in the pre-coding domain, therefore the system is easy to implement.

BRIEF DESCRIPTION OF THE DRAWINGS

To make the technical solution in the embodiments of the present invention understood better, hereunder the accompanying drawings used in the description of the embodiments or the prior art will be introduced briefly. Apparently, the drawings described below only illustrate some embodiments of the present invention. A person skilled in the art can obtain the drawings of other embodiments on the basis of these drawings without creative labor.

DETAILED DESCRIPTION OF THE EMBODIMENTS

To make the technical solution of the present invention understood better, hereunder the technical solution in the embodiments of the present invention will be described clearly and completely with reference to the accompanying drawings in the embodiments. Apparently, the embodiments described below are only part of embodiments of the present invention, instead of all embodiments of the present invention. A person skilled in the art can obtain other embodiments without creative labor, on the basis of the embodiments of the present invention; however, all these embodiments shall be deemed as falling into the protection scope of the present invention.

Figure 1:
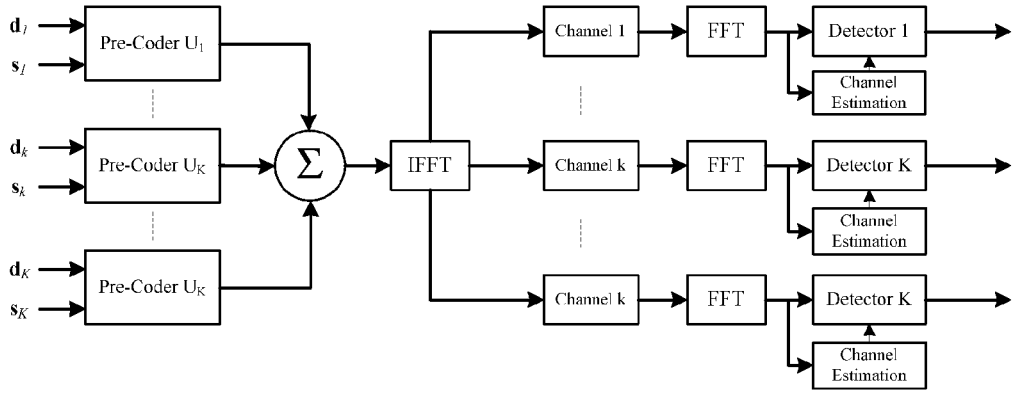
FIG. 1 is a block diagram of a SDMA MIMO transmission downlink system.
Figure 2:
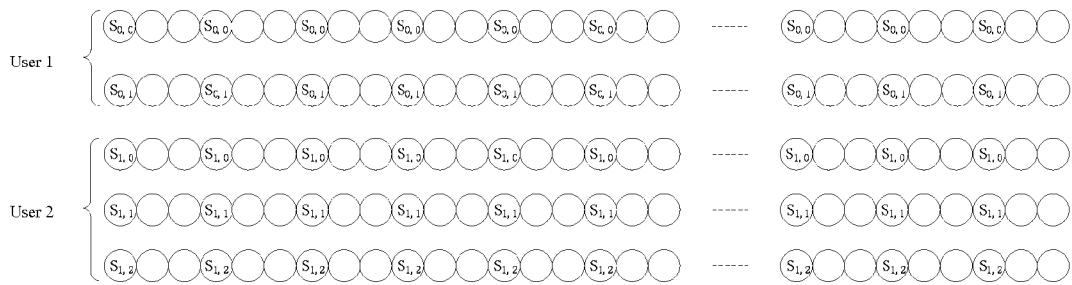
FIG. 2 is a schematic diagram of a pilot for SDMA MIMO transmission downlink in the pre-coding domain according to the present invention, wherein, the horizontal direction represents different frequency points of OFDM (Orthogonal Frequency Division Multiplexing) symbols, the vertical direction represents the different transmitted data streams of different users in the pre-coding domain, and $S_{k,j}$ represents pilot signals of the k-th user transmitted in the j-th data stream in the pre-coding domain.

FIG. 1 is a block diagram of a SDMA MIMO transmission downlink system. For the convenience of understanding, an OFDM-based transmission scheme is used in the embodiment. Suppose the number of antennae in the base station is $N_T$, the number of users is K, the independent data stream transmitted by the k-th user and the number of receiving antenna are $N_{S,k}$ and $N_k$, respectively. To save the orthogonal pilot resources, the pilots of different users are placed on the same frequency resource in the present invention, and the collection of positions of pilot signals in the frequency domain can be denoted as:

$$\Omega_P = \{\alpha_p | \alpha_p = pD_f + \alpha_0, p = 0, 1, \ldots, L_p - 1\} \quad (1)$$

wherein, $\alpha_0$ represents the position of the first pilot signal, $D_f$ represents the interval between pilot signals in the frequency domain, Lp represents the length of pilot signal, the p-th pilot of the k-th user assigned to the v-th data stream in the pre-coding domain can be denoted as:

$$s_k^v(p) = \begin{cases} c_k^v(\lfloor p/N_{S,k} \rfloor), & p \bmod N_{S,k} = v \\ 0, & p \bmod N_{S,k} \neq v \end{cases} \quad (2)$$

wherein, k=1,2, . . . ,K, v=0,1, . . . $N_{S,k}$−1, p=0, 1, . . . ,$L_p$−1; ⌊ ⌋ represents Ceiling, and $c_k^v(m)$ represents the m-th element in the Zadoff-Chu sequence in length $\lfloor L_P/N_{S,k} \rfloor$. FIG. 2 is a schematic diagram of a pilot for SDMA MIMO transmission downlink in the pre-coding domain according to the present invention. Remarkably, in the above pilot mode, the $c_k^v(m)$ or $S_k^v(p)$ used by different users can be identical or not identical.

Figure 3:
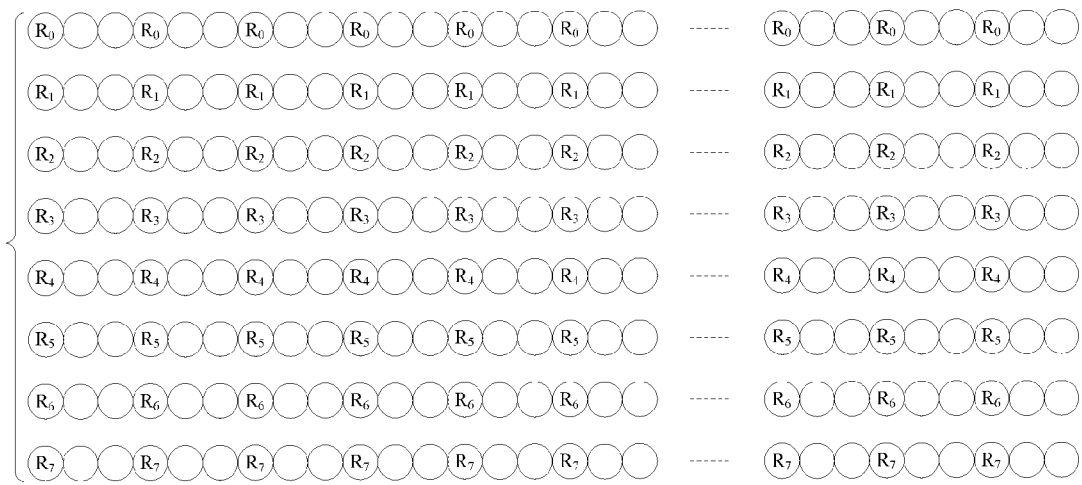
FIG. 3 is a schematic diagram of a pilot for SDMA MIMO transmission downlink in the transmitting antenna domain according to the present invention, wherein, the horizontal direction represents different frequency points of OFDM symbols, the vertical direction represents transmitted signals of different transmitting antenna, and $R_i$ represents pilot signals of the i-th transmitting antenna.

Let $S_k(p)=[S_k^0(p),S_k^1(p), \ldots ,S_k^{N_{S,k}-1}(p)]^T$ represents the vector composed of the p-th pilot of the k-th user in the pre-coding domain, then, the p-th pilot of the k-th user in the transmitting antenna domain is $U_k S_k(p)$; therefore, the p-th pilot signal of the base station in the transmitting antenna domain can be obtained as follows:

$$X(p) = \sum_{k=1}^{K} U_k s_k(p) \quad (3)$$

wherein, $U_k$ represents the pre-coding matrix or vector used by the k-th user to implement SDMA, and it is in size of $N_T \times N_{S,k}$, and has the following characteristics:

$$E_H\{\|H_k(n)U_j\|_F^2\} \approx 0, \forall k \neq j \quad (4)$$

wherein, $H_k(n)$ represents the frequency domain channel parameters of the k-th user at the n-th frequency point; $\|\ \|_F$ represents F norm of the matrix; $E_H\{\ \}$ represents average operation within a time window. The condition provided in formula (4) indicates the possible interference to SDMA transmission between the users is low. FIG. 3 is a schematic diagram of a pilot for SDMA MIMO transmission downlink in the transmitting antenna domain according to the present invention. Remarkably, in the above pilot mode, the pilot signals of different users in the transmitting antenna domain are overlaid on the same time-frequency resources when they are transmitted.

At the receiving end, the channel state information required for coherent detection and channel measurement for the users refers to the channel state information in the pre-coding domain for implementing SDMA; for the k-th user, the matrix, vector or scalar used to describe the channel state information at the n-th frequency point is the product of $H_k(n)$ and $U_k$. To estimate the compounded channel parameter of the users in the pre-coding domain, the locally known transmitted pilot signals and received pilot signals of the users can be utilized, with possible pilot signals of other users regarded as random interference. The initial estimation is performed with the common least square channel estimation method.

Let $Y_k(p)$ represents the p-th pilot signal received by the k-th user in the frequency domain, then:

$$Y_k(p)=H_k(\alpha_p)X(p)+Z_k(p) \quad (5)$$

wherein, $H_k(\alpha_p)$ represents the frequency domain channel parameters of the k-th user at the p-th pilot or the $\alpha_p$-th frequency point , and it is in size of $N_k \times N_T$; $Z_k(p)$ represents additive white Gaussian noise. Plug formula (3) into formula (5), and tidy up formula (5) to obtain:

$$Y_k(p) = \overline{H}_k(\alpha_p) S_k(p) + \tilde{Z}_k(p) \quad (6)$$

wherein, $\overline{H}_k(\alpha_p) = H_k(\alpha_p) U_k$ represents the compounded channel parameters of the k-th user at the p-th pilot or the $\alpha_p$-th frequency point in the pre-coding domain, and it is in size of $$N_k \times N_{S,k}; \tilde{Z}_k(p) = H_k(\alpha_p) \sum_{j=1, j \neq K}^{K} U_j s_j(p) + Z_k(p)$$

represents possible interference and noise to the k-th user at the p-th pilot. If the receiving pilot of the k-th user on the μ-th antenna is considered only, the following formula can be obtained from formula (6):

$$Y_k^\mu(p) = \sum_{v=1}^{N_{S,k}} \overline{H}_k^{\mu,v}(\alpha_p) s_k^v(p) + \tilde{Z}_k^\mu(p) \quad (7)$$

wherein, $\overline{H}_k^{\mu,v}(\alpha_p)$ represents the (μ, v)-th element of matrix $\overline{H}_k(\alpha_p)$; $Y_k^\mu(p)$ and $\tilde{Z}_k^\mu(p)$ represent the μ-th element of $Y_k(p)$ and $\tilde{Z}_k(p)$, respectively. It is seen from formula (2) and (7), when p mod $N_{S,k} = v$, the least square estimation of $\overline{H}_{k\mu,v}(\alpha_p)$ is:

$$\hat{\overline{H}}_k^{\mu,v}(\alpha_p) = \frac{Y_k^\mu(p)}{c_k^v(\lfloor p/N_{S,k} \rfloor)} \quad (8)$$

From formula (8), a group of compounded channel parameters at frequency points spaced at an even interval can be obtained, and then the parameters can be further estimated more accurately with techniques such as decorrelation, interpolation, and filtering.

In the embodiments of the present application, it should be appreciated that the method disclosed can be implemented in other ways, without departing from the spirit and scope of the present application. The embodiments provided here are only exemplary examples, and shall not be deemed as constituting any limitation to the present application, and the content described shall not be deemed as constituting any limitation to the purpose of the patent application. For example, a plurality of units or components can be combined or integrated into another system, or some features can be omitted, or excluded from the execution.

While the present invention has been illustrated and described with reference to some preferred embodiments, the present invention is not limited to these. A person skilled in the art should recognize that various variations and modifications can be made without departing from the spirit and scope of the present invention. Therefore, the protection scope of the present invention should be defined by the claims.

The invention claimed is:

1. A pilot and channel estimation method, for SDMA MIMO transmission downlink, including:
   for the MIMO transmission downlink that employs pre-coding for SDMA, taking the quantity of orthogonal pilot resources occupied by one or more users in a pre-coding domain as a number of data streams that are transmitted or a number of spatial dimensions occupied first, at the transmitting end of a base station; then,
   performing SDMA transmission pre-coding for one or more orthogonal pilots in the pre-coding domain in the same way as one or more data signals, to obtain one or more pilot signals of the users in a transmitting antenna domain;
   wherein, the one or more pilot signals of the users in the pre-coding domain are orthogonal in a frequency domain or a code domain, and the one or more pilot signals of different users in the pre-coding domain are identical or not identical to each other; and the one or more pilot signals of different users in the transmitting antenna domain occupy same time-frequency resources; and
   at the receiving end of the users, obtaining a channel state information required for coherent detection and channel measurement for the users, with one or more transmitted pilot signals and one or more received known pilot signals.

2. The pilot and channel estimation method, for SDMA MIMO transmission downlink according to claim 1, wherein,
   the pre-coding is one of short-time pre-coding that utilizes short-time channel state information or long-time pre-coding that utilizes long-time channel state information;
   if short-time pre-coding is used to implement SDMA, both the pilot signals and data signals are transmitted in a short-time pre-coding domain;
   if long-time pre-coding is used to implement SDMA, the pilot signals are transmitted in a long-time pre-coding domain, while the data signals are transmitted in the long-time pre-coding domain or in the pre-coding domain where long-time pre-coding and short-time pre-coding are compounded.

3. The pilot and channel estimation method, for SDMA MIMO transmission downlink according to claim 1, wherein,
   the channel state information required for coherent detection and channel measurement for the users refers to the channel state information in the pre-coding domain for implementing SDMA, and
   at least one of a matrix, vector or scalar, used to describe the channel state information at a single frequency point is the product of a corresponding channel matrix or vector of the users and the pre-coding matrix or vector of the users;
   one or more compounded channel parameters in the pre-coding domain of the users are estimated initially using a common least square channel estimation method.

* * * * *